March 25, 1969     H. O. SORENSEN     3,435,232

BEAM POSITION DETECTOR

Filed March 5, 1966

INVENTOR
HANS O. SORENSEN

BY    Q. C. Smith

ATTORNEY

United States Patent Office 3,435,232
Patented Mar. 25, 1969

3,435,232
BEAM POSITION DETECTOR
Hans O. Sorensen, Palo Alto, Calif., assignor to Hewlett-Packard Company, Palo Alto, Calif., a corporation of California
Filed Mar. 3, 1966, Ser. No. 531,618
Int. Cl. G01j 1/20
U.S. Cl. 250—203          2 Claims

ABSTRACT OF THE DISCLOSURE

A target includes an array of detectors of electromagnetic radiation and which provides signal outputs related to the rectangular coordinates of the position of a radiation beam on a target.

---

In accordance with the illustrated embodiment of the present invention, a plurality of elongated radiation-responsive elements are disposed along rectangular coordinate axes in the target area of a beam of electromagnetic radiation such as light.

Other and incidental objects of the present invention will be apparent from a reading of this specification and an inspection of the accompanying drawing in which.

Figure 1:
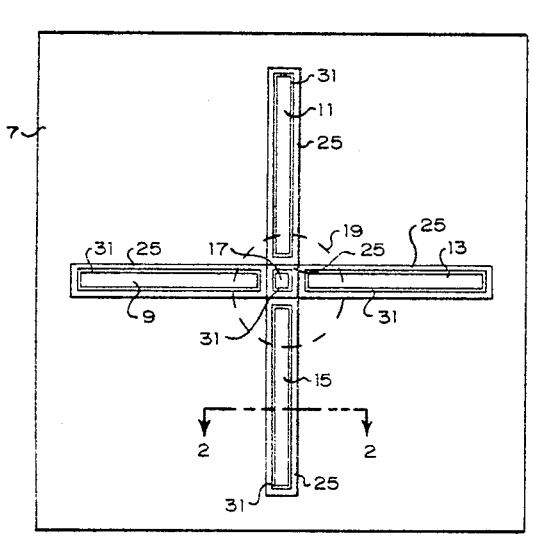
FIGURE 1 is a plan view showing the layout of the radiation-responsive elements.

Referring to FIGURE 1, there is shown a plurality of radiation-responsive elements 9–15 arranged in a beam target area on rectangular coordinate axes with another similar element 17 disposed at the intersection or origin of the axes. These elements have electrical parameters which are related to the incident electromagnetic radiation and may be photoconductive elements or, more desirably, photodiodes. An incident beam 19 of electromagnetic radiation such as light or infrared radiation from a laser or other source having a beam area which is sufficiently large compared with the dimensions of the elements 9–15 at least to irradiate all the elements in the region of the intersection, thus alters the parameters to the greatest extent of the elements 9–15 on the side of the intersection on which the beam is positioned. For photodiode elements, element 13 would thus provide greater photocurrent than the element 9 would provide and element 15 would provide greater photocurrent than the element 11 would provide for a beam 19 positioned as shown. By simply subtracting the photocurrent of element 9 from the photocurrent of element 13, the position of the beam 19 along the horizontal axis relative to the intersection can be determined. Similarly subtracting the photocurrent of element 11 from the photocurrent of element 15 provides an indication of the position of the beam 19 relative to the intersection.

The difference between the photocurrents or other electrical parameters of the elements on the same axis on opposite sides of the intersection is dependent upon the intensity of the incident radiation and thus the magnitude of this difference may provide an erroneous indication of the position of the incident beam of radiation as its intensity varies. Element 17 is provided at the origin or intersection of the axes to provide a normalizing output related to the intensity of the incident radiation. The output of element 17 may thus be used as the reference for comparison with the difference signal from elements 9, 13 and 11, 15, thereby to provide normalized output signals indicative of the position of the beam 19, independent of the intensity of the beam.

Figure 2:
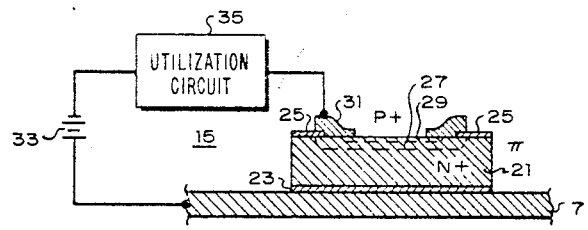
FIGURE 2 is a sectional view of the radiation-responsive element.

The sectional view of FIGURE 2 shows the typical structure of photodiodes used as elements 9–17. The body 21 of n-type silicon semiconductor material is attached to the base 7 and the ohmic contact region 23 provides electrical contact to the body 21. The radiation-receiving upper surface of the body 21 is partially insulated, for example, using an oxide of silicon to provide an insulating frame 25 around the elements 9–17. A thin π-type or electrically neutral layer 27 is formed within the body 21 by commonly known diffusion methods and a surface layer 29 of p-type material is formed using commonly known diffusion techniques in the body 21 within the areal extent of the π-type layer to form a passivated photodiode. Electrical contact is made to the p-type layer through a deposited gold electrode 31 which surrounds the active region of each of elements 9–17. The photodiodes may be back-biased by the external circuit including source 33 and utilization circuit 35 such that the reverse leakage current flowing through the utilization circuit 35 and photodiode 9–17 is related to the total incident radiation over the area of the photodiode.

Figure 3:
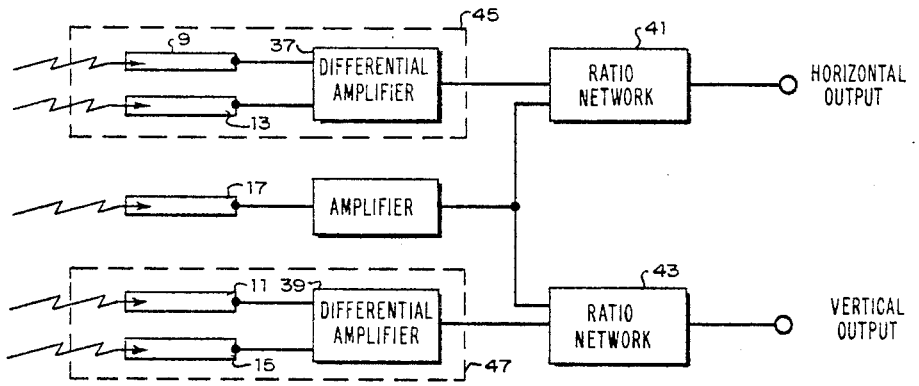

FIGURE 3 is a block diagram showing the connection of the outputs of the horizontally-disposed elements 9, 13 to the inputs of a differential amplifier 37 for producing an output related to the horizontal coordinate of the position of beam 19 with respect to the origin. Similarly, differential amplifier 39 connected to receive the outputs of the vertically-disposed elements 11, 15 produces an output related to the vertical coordinate of the position of beam 19 with respect to the origin. Each of the outputs of amplifiers 37 and 39 is then normalized by combining the output in a ratio network 41, 43 with the amplified output of the origin element 17 to produce the horizontal and vertical outputs related to the respective coordinates of the beam 19, independent of its intensity.

Figure 4:
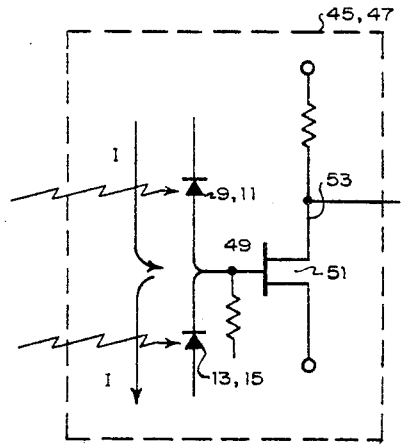
FIGURES 3 and 4 are schematic diagrams of circuits for providing output signals related to the position of a beam of electromagnetic radiation on the target area.

FIGURE 4 shows a simplification of the circuit 45, 47 for algebraically compining the outputs of pairs of the elements where the elements 9–15 are photodiodes. The respective pairs of diodes may be serially connected in conduction aiding relationship with the gate electrode 49 of an insulated-gate, field-effect transistor 51 connected to the common connection of the diode pairs. Thus the difference of photocurrents flowing in the diode pairs 9, 13 and 11, 15 produces a related output at the drain electrode 53 of the transistor 51.

I claim:
1. Position detector apparatus for a beam of electromagnetic radiation comprising:
   a first pair of elongated radiation-responsive elements disposed along intersecting axes near the intersection thereof, each of the elements producing an output in response to incident radiation;
   second pair of elongated radiation-responsive elements disposed along said axes on the sides of the intersection thereof opposite the elements of said first pair, each of the elements in the second pair producing an output related to incident radiation;
   first means connected to receive the outputs of the elements in said first and second pairs disposed along a common axis for producing a signal related to the algebraic combination of said outputs from such elements;
   second means connected to receive the outputs of the remaining elements in said first and second pairs for producing a signal related to the algebraic combination of said outputs from such remaining elements;
   a radiation-responsive element disposed at the intersection of said axes for producing an output in response to incident radiation; and means connected to receive the output from said element disposed at the intersection of said axes and to receive the signals from said first and second means for producing normalized output signals, each as the combination of the output of said element disposed at the intersection of said axes and one of said signals, the normalized output signals being indicative of the position of a beam of electromagnetic radiation with respect to the intersection of said axes independent of the intensity of the incident beam of electromagnetic radiation.

2. Apparatus as in claim 1 wherein:

said named elements in the first and second pairs are photodiodes, the ones of which disposed along a common axis are serially connected in conduction-aiding relationship;

an amplifier is provided having an input connected to the common connection of said ones of the photodiodes for producing said signals as the difference between currents flowing in the reverse direction through said ones of the diodes.

References Cited

UNITED STATES PATENTS

| | | | |
|---|---|---|---|
| 3,143,650 | 8/1964 | Mizen | 250—203 X |
| 3,210,548 | 10/1965 | Morrison | 250—203 X |
| 3,316,800 | 5/1967 | Kibler. | |
| 3,354,313 | 11/1967 | Lombard et al. | |

FOREIGN PATENTS 1,375,221  9/1964  France.

RALPH G. NILSON, *Primary Examiner.*

C. M. LEEDOM, *Assistant Examiner.*

U.S. Cl. X.R.

250—211; 88—1